United States Patent
Jang

(10) Patent No.: US 9,580,887 B2
(45) Date of Patent: Feb. 28, 2017

(54) METHOD FOR CONTROLLING COOLING FAN-BRAKE OF CONSTRUCTION EQUIPMENT

(71) Applicant: DOOSAN INFRACORE CO., LTD., Incheon (KR)

(72) Inventor: In Pyo Jang, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 308 days.

(21) Appl. No.: 14/368,969

(22) PCT Filed: Dec. 26, 2012

(86) PCT No.: PCT/KR2012/011465
§ 371 (c)(1),
(2) Date: Jun. 26, 2014

(87) PCT Pub. No.: WO2013/100563
PCT Pub. Date: Jul. 4, 2013

(65) Prior Publication Data
US 2014/0373925 A1    Dec. 25, 2014

(30) Foreign Application Priority Data
Dec. 28, 2011    (KR) .................. 10-2011-0144299

(51) Int. Cl.
*F16D 31/02* (2006.01)
*E02F 9/22* (2006.01)
(Continued)

(52) U.S. Cl.
CPC .............. *E02F 9/2221* (2013.01); *B60T 1/08* (2013.01); *B60T 5/00* (2013.01); *E02F 9/226* (2013.01);
(Continued)

(58) Field of Classification Search
CPC ................ B60T 1/08; E02F 9/226; F01P 1/06
(Continued)

(56) References Cited

U.S. PATENT DOCUMENTS 6,848,255 B2    2/2005  Chiaramonte
6,918,248 B2 *  7/2005  Reiners ................. E02F 9/2267
                                                60/456
(Continued)

FOREIGN PATENT DOCUMENTS

JP       H08-183444      7/1996
KR    10-2003-0050235    6/2003
(Continued)

OTHER PUBLICATIONS

Search Report dated Apr. 16, 2013 and written in Korean with English translation for International Patent Application No. PCT/KR2012/011465 filed Dec. 26, 2012, 5 pages.

*Primary Examiner* — Michael Leslie
(74) *Attorney, Agent, or Firm* — John D. Veldhuis-Kroeze; Westman, Champlin & Koehler, P.A.

(57) ABSTRACT

The present disclosure provides a method for controlling a cooling fan-brake of construction equipment, including: generating a brake charging signal of a brake unit; charging hydraulic oil with a high flow rate in the brake unit and completing the charging of hydraulic oil; turning a loading valve of a cooling fan unit off and turning an unloading valve of the cooling fan unit on when the hydraulic oil is charged; and turning the loading valve of the cooling fan unit on and turning the unloading valve of the cooling fan unit off after the charging of hydraulic oil is completed and a predetermined time elapses.

6 Claims, 5 Drawing Sheets

(51) Int. Cl.
    *B60T 1/08*         (2006.01)
    *F01P 1/06*         (2006.01)
    *B60T 5/00*         (2006.01)
    *F01P 7/04*         (2006.01)
    *F16D 65/78*        (2006.01)

(52) U.S. Cl.
    CPC ........... *E02F 9/2217* (2013.01); *E02F 9/2253* (2013.01); *E02F 9/2296* (2013.01); *F01P 1/06* (2013.01); *F01P 7/044* (2013.01); *F16D 2065/782* (2013.01); *F16D 2065/784* (2013.01); *Y10T 137/0318* (2015.04)

(58) Field of Classification Search
    IPC ........................................................ F01P 1/06
    See application file for complete search history.

(56) References Cited

U.S. PATENT DOCUMENTS

| | | | | |
|---|---|---|---|---|
| 7,240,486 | B2* | 7/2007 | Huang | E02F 9/226 60/413 |
| 2014/0144130 | A1* | 5/2014 | Vigholm | E02F 9/226 60/418 |

FOREIGN PATENT DOCUMENTS

| | | |
|---|---|---|
| KR | 10-2010-0057131 | 5/2010 |
| KR | 10-2011-0052073 | 5/2011 |

\* cited by examiner

Figure 5A
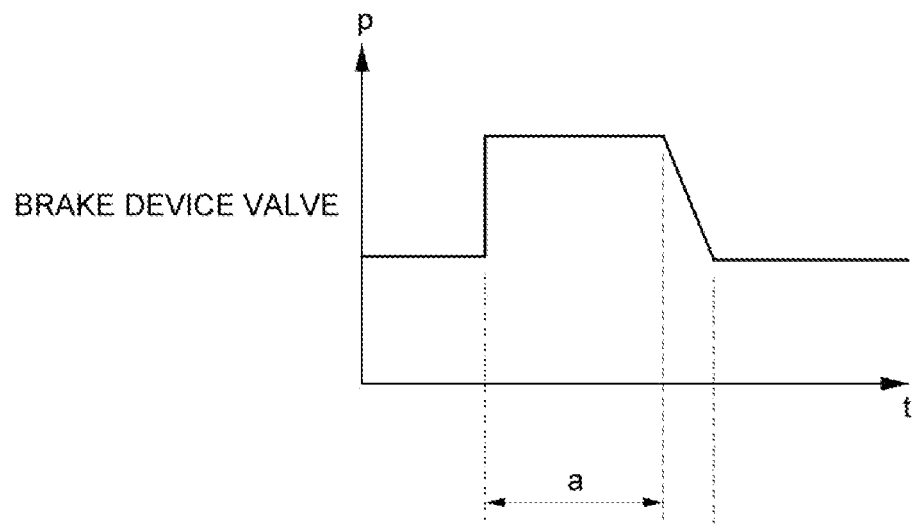
Figure 5B
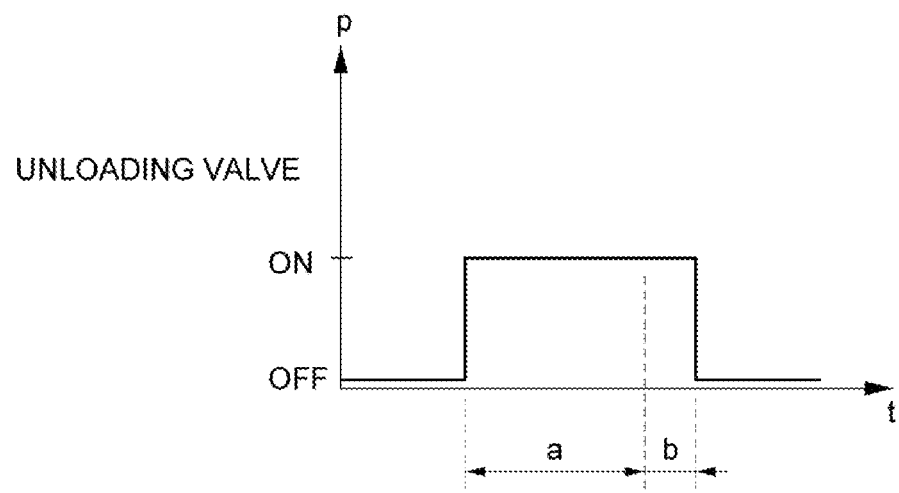
FIG. 5B

Figure 5C
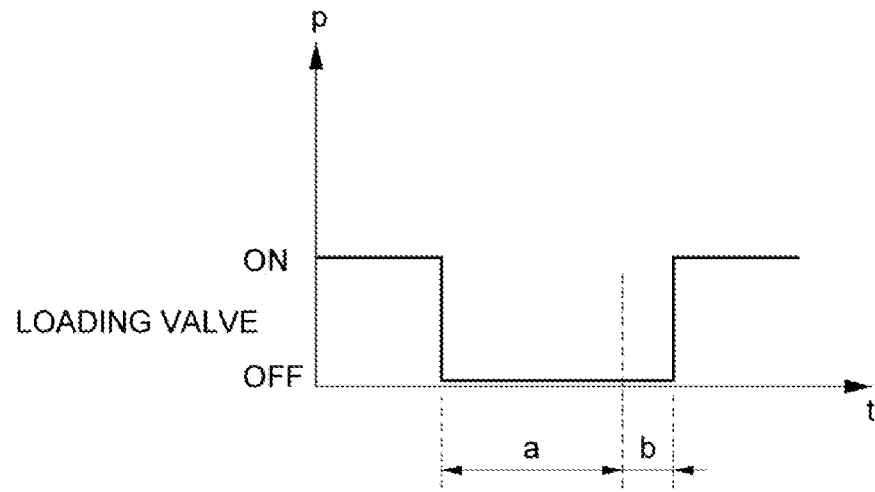
FIG. 5C
Figure 5D
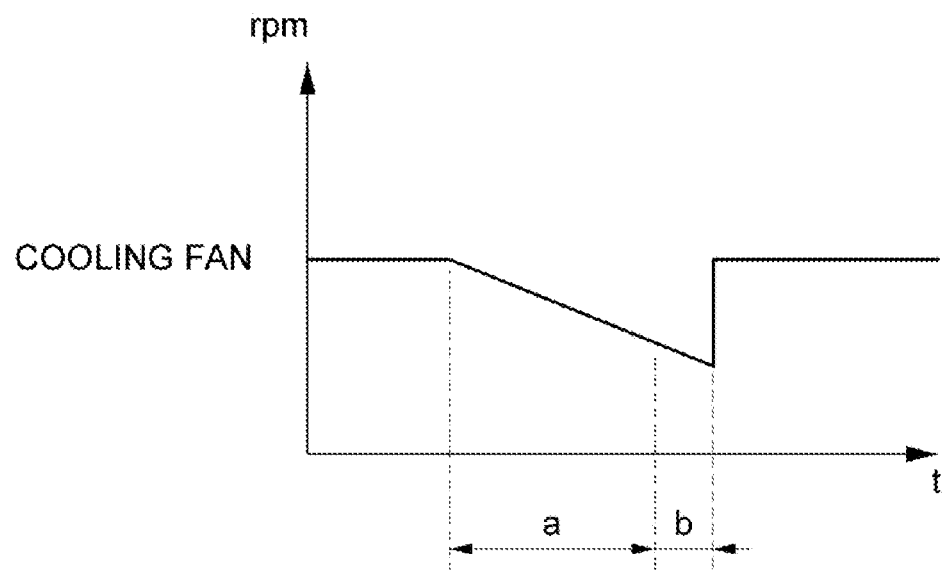
FIG. 5D

METHOD FOR CONTROLLING COOLING FAN-BRAKE OF CONSTRUCTION EQUIPMENT

CROSS-REFERENCE TO RELATED APPLICATION

This Application is a Section 371 National Stage Application of International Application No. PCT/KR2012/011465, filed Dec. 26, 2012 and published, not in English, as WO 2013/100563 on Jul. 4, 2013.

FIELD OF THE DISCLOSURE

The present disclosure relates to a method for controlling a cooling fan-brake of construction equipment, and more particularly, to a method for controlling a cooling fan-brake of construction equipment which is capable of prevent a cooling fan from being operated at overspeed when a brake is charged in a system for controlling a cooling fan unit and a brake unit by appropriately controlling a variable pump according to a situation.

BACKGROUND OF THE DISCLOSURE

In general, construction equipment, such as a wheel loader, mainly performs excavation or a loading task or a transportation task of accumulated earth and sand. The construction equipment includes a cooling fan unit which drives a cooling fan in order to cool hydraulic oil, cooling water of an engine, or gear shift lubricating oil of a transmission, and a brake unit for braking a vehicle, and hydraulic oil discharged from one pump is supplied to drive the cooling fan unit and the brake unit.

More particularly, the hydraulic oil discharged from one pump is primarily supplied to the brake unit by a main control value to accumulate a predetermined pressure in the brake unit, and when the pressure accumulated in the brake unit is equal to or greater than a reference charging pressure, the hydraulic oil is supplied to the cooling fan unit and is controlled by a cooling fan-brake control system.

FIG. 1 is a diagram illustrating a cooling fan-brake control system of construction equipment, and FIG. 2 is a graph illustrating overspeed of the cooling fan after a brake is charged in the cooling fan-brake control system of FIG. 1.

As illustrated in FIGS. 1 and 2, the cooling fan-brake control system applied to the construction equipment in the related art includes a pressure detection unit 1 detecting pressure of a brake, a temperature detection unit 2 detecting a temperature of an engine and hydraulic oil of the engine, a controller 6 receiving pressure information and temperature information from the pressure detection unit 1 and the temperature detection unit 2, respectively, and controlling a flow rate of hydraulic oil discharged from a pump 5 so that the hydraulic oil is supplied from the pump 5 to each of a cooling fan unit 3 and a brake unit 4, and a main control valve 7 supplying the hydraulic oil to each of the cooling fan unit 3 and the brake unit 3 under a control of the controller 6.

Here, the controller 6 may receive a signal from the temperature detection unit 2 to operate the pump 5, and the hydraulic oil discharged from the pump 5 may rotate the cooling fan of the cooling fan unit 3 through the main control valve 7, thereby cooling the engine or the hydraulic oil. Further, the controller 6 may receive a signal from the pressure detection unit 1 to operate the pump 5 so as to normally operate the brake, in addition to the operation of the cooling fan unit 3, and the hydraulic oil discharged from the pump 5 may make a pressure of the brake unit 4 be maintained at a predetermined value or more through the main control valve 7.

However, in the cooling fan-brake control system applied to the construction equipment in the related art, when the hydraulic oil discharged from the pump 5 is rapidly increased in order to charge a pressure of the brake unit 4 according to the operation of the brake unit 4 in the state where the cooling fan is being rotated by the hydraulic oil, the hydraulic oil with a high-pressure/high flow rate is temporarily supplied to the cooling fan unit 3 just after the charging of the brake, so that there is a problem in that the cooling fan is operated at overspeed and thus fuel efficiency deteriorates and noise is increased.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure is conceived to solve the aforementioned problem, and an object of the present disclosure is to provide a method for controlling a cooling fan-brake of construction equipment which is capable of preventing a cooling fan from being operated at overspeed by unloading hydraulic oil supplied to a cooling fan unit for a predetermined time during charging of a brake in a system for controlling the cooling fan unit and a brake unit.

The object of the present disclosure is not limited to the aforementioned object, and those skilled in the art will clearly understand non-mentioned other objects through the following description.

In order to achieve the above object, the present disclosure provides a method for controlling a cooling fan-brake of construction equipment, including: generating a brake charging signal of a brake unit; charging hydraulic oil with a high flow rate in the brake unit and completing the charging of hydraulic oil; turning a loading valve of a cooling fan unit off and turning an unloading valve of the cooling fan unit on when the hydraulic oil is charged; and turning the loading valve of the cooling fan unit on and turning the unloading valve of the cooling fan unit off after the charging of hydraulic oil is completed and a predetermined time elapses.

Here, the brake charging valve of the brake unit may be turned on when the hydraulic oil is charged, and the brake charging valve of the brake unit may be turned off when the hydraulic oil is completely charged.

Further, the predetermined time after the charging completion of the hydraulic oil may be 0.5 second.

According to the cooling fan-brake control method of construction equipment, when a charging signal of the brake is generated from the brake unit, hydraulic oil with a high flow rate loaded to the cooling fan unit is unloaded from a start time of the charging of the brake to a completion time of the charging of the brake and a predetermined time after the completion time of the charging of the brake, so that revolutions per minute of the cooling fan are decreased for a section of the unloading, thereby preventing overspeed of the cooling fan.

However, an effect of the present disclosure is not limited to the aforementioned effect, and those skilled in the art will clearly understand non-mentioned other effects through the description of the accompanying claims.

DESCRIPTION OF THE DRAWINGS

FIG. 5 is a graph illustrating a change in speed of a cooling fan controlled by the cooling fan-brake control method of the construction equipment of FIG. 4.

DETAILED DESCRIPTION

Hereinafter, a cooling fan-brake control method of construction equipment according to an exemplary embodiment of the present disclosure will be described in detail.

Figure 1:
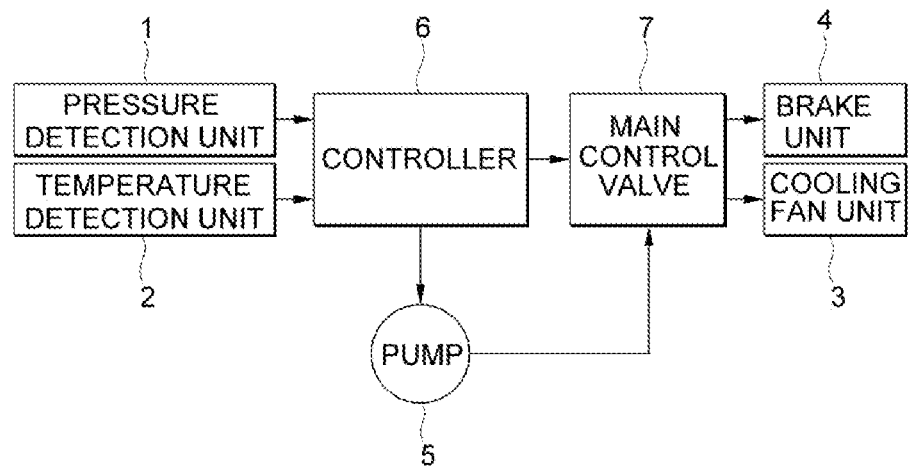
FIG. 1 is a diagram illustrating a cooling fan-brake control system of construction equipment.
Figure 2:
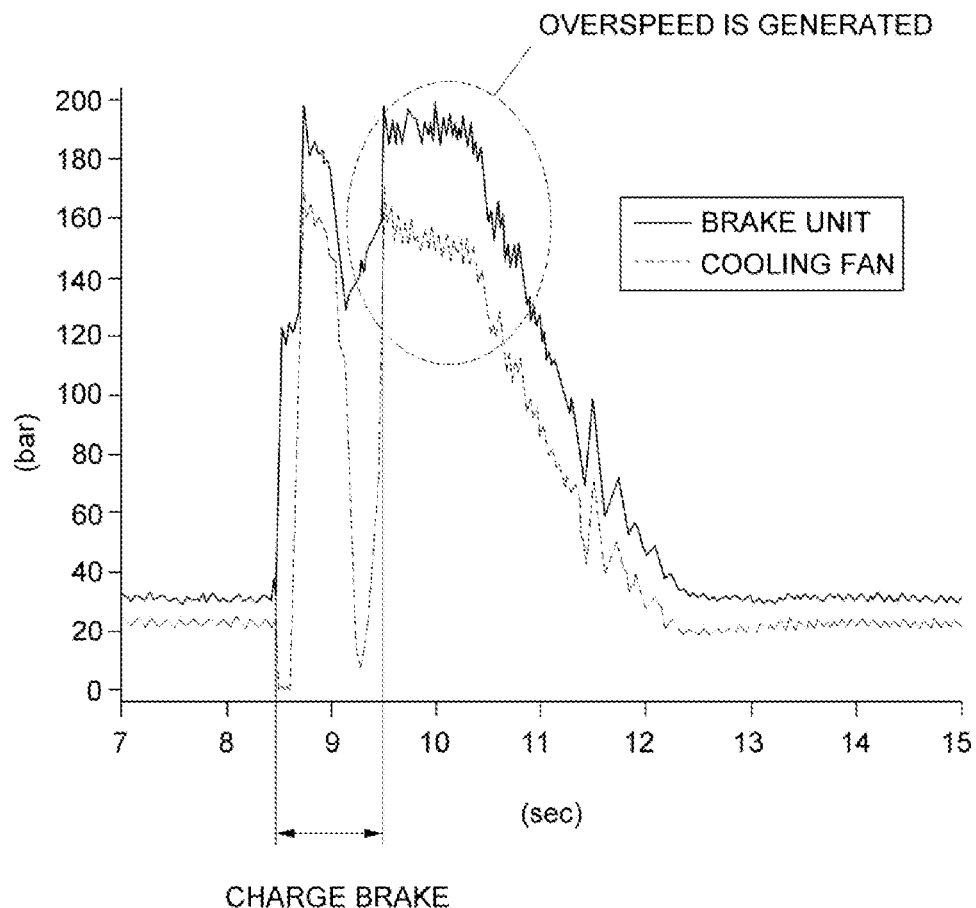
FIG. 2 is a graph illustrating overspeed of the cooling fan after a brake is charged in the cooling fan-brake control system of the construction equipment of FIG. 1.
Figure 3:
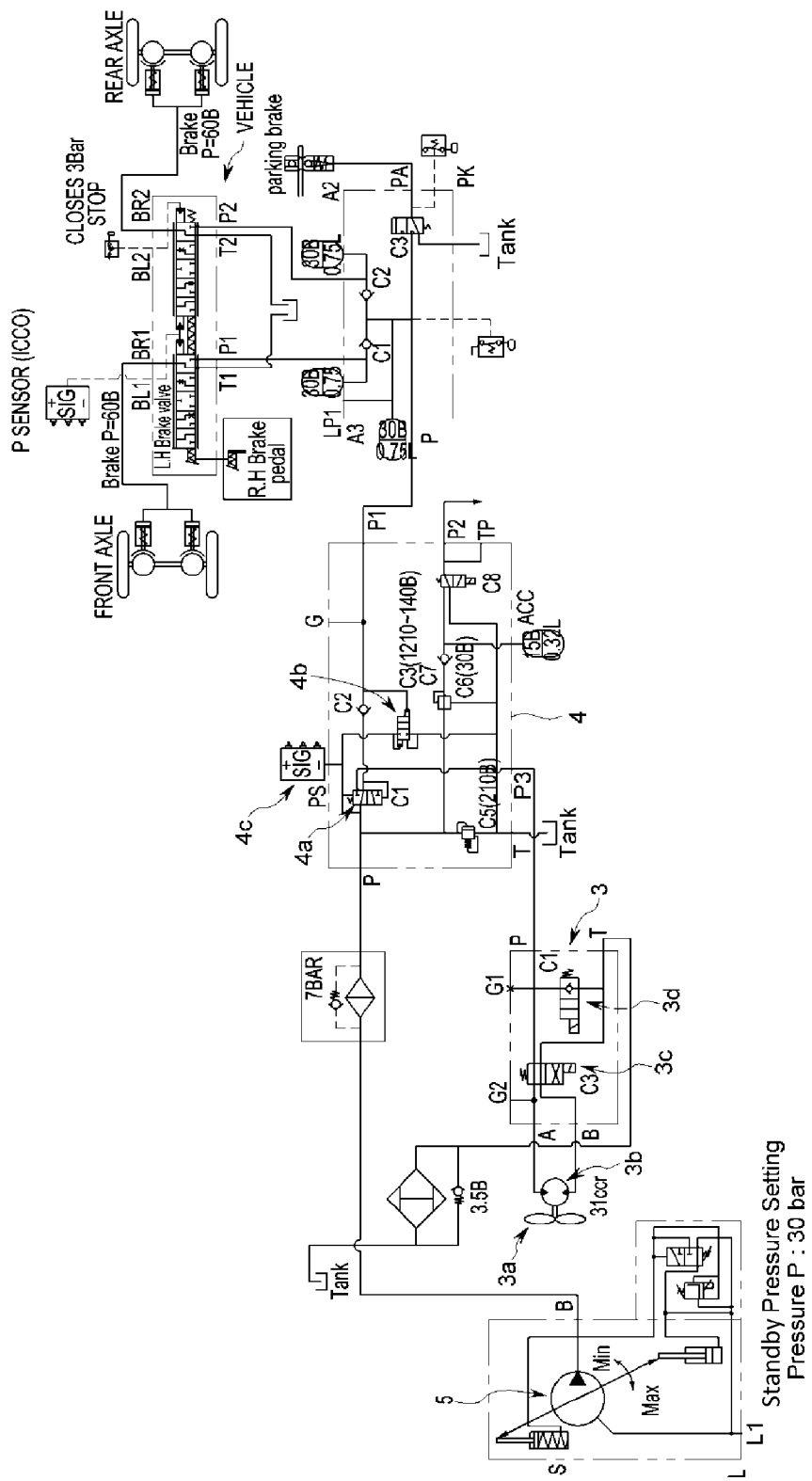
FIG. 3 is a circuit diagram illustrating a cooling fan-brake control system of construction equipment according to an exemplary embodiment of the present disclosure.
Figure 4:
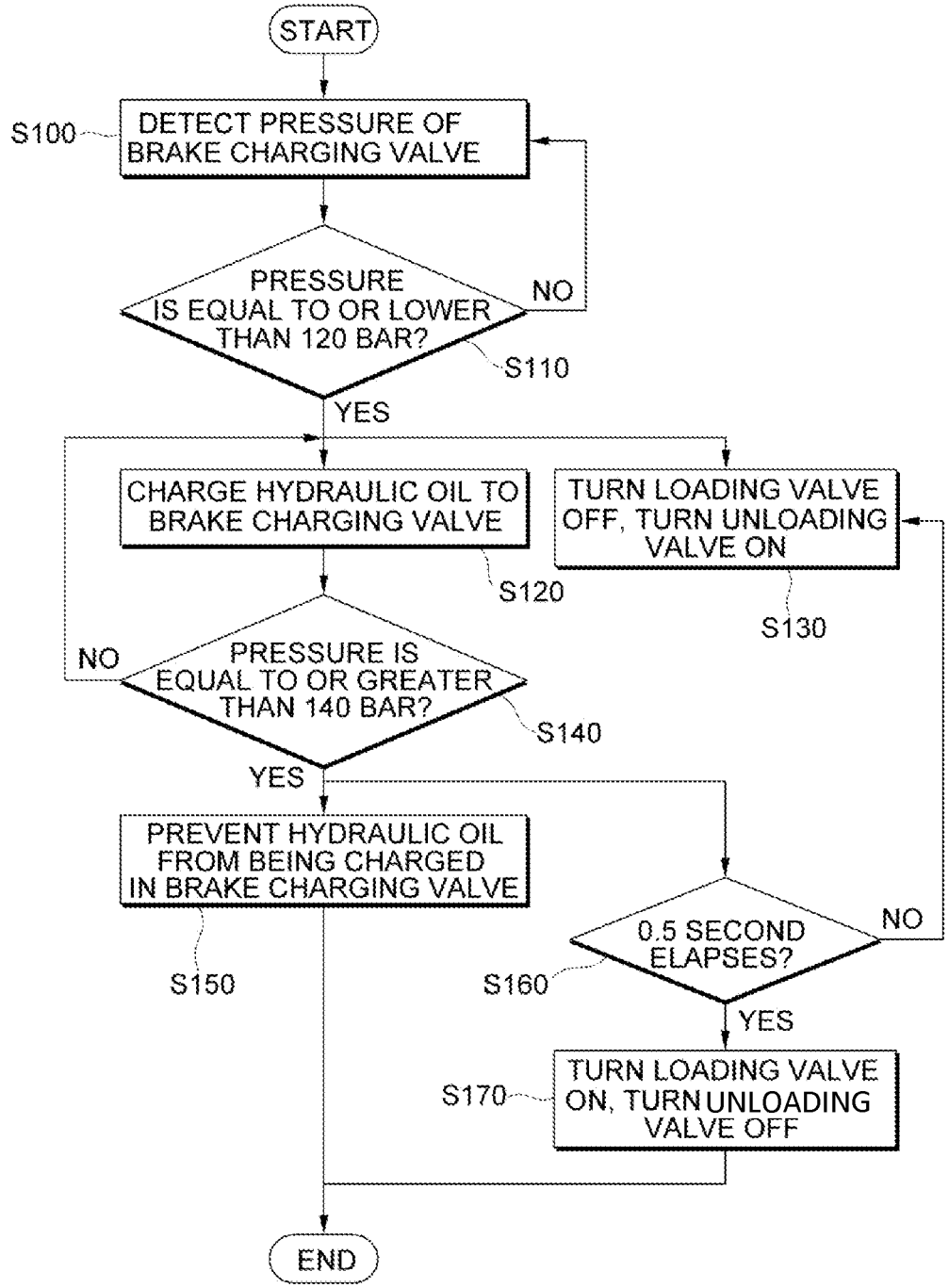
FIG. 4 is a control flowchart illustrating a cooling fan-brake control method of construction equipment according to an exemplary embodiment of the present disclosure.

As illustrated in FIGS. 1, and 3 to 5, in a cooling fan-brake control method of construction equipment according to an exemplary embodiment of the present disclosure, a controller 6 detects a pressure of a brake charging valve 4a of a brake unit 4 through a pressure detection unit 1 in a state where construction equipment starts (S100).

In this case, a cooling fan 3 of the construction equipment is in a normally controlled state, and more preferably, hydraulic oil is charged from a brake priority valve 4b until the brake charging valve 4a of the brake unit 4 has a pressure of 120 bar or greater, and then hydraulic oil is loaded into a motor 3b of the cooling fan unit 3. Here, a loading valve 3c is in an on state, and an unloading valve 3d is in an off state so that the hydraulic oil is loaded into the motor 3b through the brake priority valve 4b.

When the pressure of the brake charging valve 4a detected in operation S100 is equal to or lower than 120 bar (S110), the controller 6 makes the brake unit 4 to operate the brake priority valve 4b and the brake charging valve 4a so that the hydraulic oil is first charged in the braking charging valve 4a from the main control valve 7 (S120).

Here, in the pump 5, a flow controller (not illustrated) is controlled so that a discharge rate of the hydraulic oil has a maximum value under the control of the controller 6, and the brake charging valve 4a may continue charging until the pressure of the hydraulic oil is equal to or greater than about 140 bar.

In the meantime, in order to prevent the hydraulic oil with a high-pressure/high flow rate from being temporarily supplied to the motor 3b driving the cooling fan 3a of the cooling fan unit 3 through the brake priority valve 4b when the hydraulic oil is first charged to the brake charging valve 4a of the brake unit 4, the controller 6 makes the cooling fan unit 3 turn the unloading valve 3d on and turn the loading valve 3c off as illustrated in FIGS. 5B and 5C from a start time of the charging of the brake, so that loading of the hydraulic oil with a high flow rate loaded to the motor 3b is blocked (S130).

After operations S120 and S130, the controller 6 subsequently detects whether the hydraulic oil is in a charged state by receiving a signal from a brake charging sensor 4c through the pressure detection unit 1, and then when the pressure of the braking charging valve 4a is equal to or greater than 140 bar (S140), the controller 6 makes the brake unit 4 operate the brake priority valve 4b and the brake charging valve 4a so that the brake charging valve 4a is prevented from being charged with the hydraulic oil from the main control valve 7 (S150).

Here, in the pump 5, the flow controller (not illustrated) may be controlled so that a discharge rate of the hydraulic oil is in a normal state under the control of the controller 6.

In the meantime, when the pressure of the brake charging valve 4a detected in operation S140 is equal to or greater than 140 bar, the controller 6 makes the cooling fan unit 3 to determine whether a predetermined time b, that is, 0.5 second, elapses from a time at which the charging of the brake is blocked (completed) (S160), and makes the cooling fan unit 3 to turn the unloading valve 3d off and turn the loading valve 3c on when the predetermined time b elapses as illustrated in FIGS. 5B and 5C, thereby allowing the normal amount of hydraulic oil to be loaded to the motor 3b (S170).

Here, 0.5 second that is the predetermined time b represents a minimum time for which the discharged hydraulic oil at a moment of completion of the charging of the brake is drained to a tank so as to have the same flow rate as that of the discharged hydraulic oil before generating charging of the brake. That is, the hydraulic oil is prevented from being loaded to the motor 3b for about 0.5 second after the start and the completion of the charging of the brake, so that even though the charging of the brake is completed, it is possible to prevent overspeed of the motor 3b generated by the hydraulic oil with a high flow rate existing in a hydraulic oil supply line.

Accordingly, the cooling fan-brake control method of the construction equipment, as illustrated in FIG. 5D, revolutions per minute of the cooling fan 3a are decreased from the start time of the charging of the brake to the charging completion time (a) and the predetermined time (b) after the charging completion time (a), thereby preventing overspeed of the cooling fan 3a.

Although the exemplary embodiments of the present disclosure have been described with reference to accompanying drawings, those skilled in the art will appreciate that various modifications, additions and substitutions are possible, without departing from the scope of the technical spirit or the essential feature of the disclosure, so that the exemplary embodiments may be implemented to other particular forms. Therefore, it shall be understood that the aforementioned exemplary embodiments are all illustrative and are not restrictive.

According to the cooling fan-brake control method of construction equipment according to the present disclosure, when a charging signal of the brake is generated from the brake unit, hydraulic oil of a high flow rate, which is loaded to the cooling fan unit, is unloaded from a start time of charging of the brake to a completion time of the charging of the brake and a predetermined time, so that revolutions per minute of the cooling fan are decreased for a section of the unloading, thereby preventing overspeed of the cooling fan, which exceeds the limit of the existing technology, and in this respect, there is a possibility in that the relevant technology is used, a device, to which the present disclosure is applied, sufficiently comes into the market or is on sale, and the present disclosure may be clearly realistically implemented, so that the present disclosure is an industrially applicable disclosure.

The invention claimed is:

1. A method for controlling a cooling fan-brake of construction equipment, comprising:
   generating a brake charging signal of a brake unit in a normally controlled state;
   wherein the normally controlled state includes a loading valve of a cooling fan unit in an on state and an unloading valve of the cooling fan unit in an off state;
   making, by a controller, when a brake priority valve and a brake charging valve of the brake unit operate so that a hydraulic oil with a high flow rate is charged in the brake unit, the loading valve of the cooling fan unit to turn off and the unloading valve of the cooling fan unit to turn on when charging of the hydraulic oil; and
   turning the loading valve of the cooling fan unit on and turning the unloading valve of the cooling fan unit off after the charging of hydraulic oil is completed and a predetermined time elapses.

2. The method of claim 1, wherein the brake charging valve of the brake unit is turned off when the hydraulic oil is completely charged.

3. The method of claim 1, wherein the predetermined time after the charging completion of the hydraulic oil is 0.5 second.

4. The method of claim 1, wherein the controller detects a pressure of the brake charging valve and determines whether the hydraulic oil is in a charged state based on the pressure.

5. The method of claim 4, wherein when the pressure of the brake charging valve detected is equal to or lower than 120 bar, the controller makes the hydraulic oil to be first charged in the brake charging valve.

6. The method of claim 4, wherein the controller makes the brake charging valve to continue to charge until the pressure of the hydraulic oil is equal to or greater than about 140 bar.

* * * * *